(12) United States Patent
Okubo et al.

(10) Patent No.: US 6,329,441 B1
(45) Date of Patent: Dec. 11, 2001

(54) POLYURETHANE FOAM FOR SHOE SOLES

(75) Inventors: Makoto Okubo; Atsushi Ishikawa; Hiroshi Kitagawa, all of Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/555,928

(22) PCT Filed: Dec. 24, 1998

(86) PCT No.: PCT/JP98/05935

§ 371 Date: Jun. 6, 2000

§ 102(e) Date: Jun. 6, 2000

(87) PCT Pub. No.: WO99/33893

PCT Pub. Date: Jul. 8, 1999

(30) Foreign Application Priority Data

Dec. 26, 1997 (JP) .................................................... 9-361210

(51) Int. Cl.$^7$ ..................................................... C08L 75/08
(52) U.S. Cl. ........................... 521/137; 521/134; 521/159; 521/170; 521/174
(58) Field of Search .................................. 521/170, 174, 521/134, 137, 159

(56) References Cited

U.S. PATENT DOCUMENTS

| 5,510,054 | 4/1996 | Mussini . |
| 5,840,782 | * 11/1998 | Limerkens et al. .................. 521/174 |

FOREIGN PATENT DOCUMENTS

| 2457726 | 6/1976 | (DE) . |
| A1582385 | 2/1994 | (EP) . |
| A1677543 | 10/1995 | (EP) . |
| A1-9744374 | 11/1997 | (WO) . |

* cited by examiner

*Primary Examiner*—John M. Cooney, Jr.
(74) *Attorney, Agent, or Firm*—Birch, Stewart, Kolasch & Birch, LLP

(57) ABSTRACT

Microcellular polyurethane elastomer shoe sole components having exceptional physical properties may be prepared from isocyanate-terminated prepolymers derived from polyoxypropylene diols having a molecular weight of from about 2000 Da to 8000 Da, an unsaturation less than about 0.02 meq/g, and a random oxyethylene content of from about 5 to about 15 weight percent. The shoe sole components exhibit high tensile strength, elongation, resilience, and in addition have excellent tear strength, particularly 90° angle tear.

5 Claims, 1 Drawing Sheet

POLYURETHANE FOAM FOR SHOE SOLES

This application is the national phase under 35 U.S.C. § 371 of PCT International Application No. PCT/JP98/05935 which has an International filing date of Dec. 24, 1998, which designated the United States of America.

TECHNICAL FIELD

The present invention relates to a polyurethane foam for shoe soles, which can be desirably used, for instance, for shoe soles for sport shoes, particularly for low-density soles.

BACKGROUND ART

Polyether polyurethane has excellent antibacterial property and excellent flexural strength at low temperatures, and particularly excellent hydrolysis resistance, as compared to polyester polyurethane. However, the polyether polyurethane has poor mechanical properties such as abrasion resistance and flexural strength at ambient temperature, and there are some defects in that peeling of a skin layer and molding shrinkage are likely to take place during foaming.

In order to improve the mechanical properties of the polyether polyurethane, there has been proposed to substitute a part or whole of the polyoxypropylene polyol used as a polyol component for polyoxytetramethylene glycol. A usual polyurethane can be practically used as soles having a high density ranging from 0.5 to 1.3 g/cm$^3$, but it would be difficult to use the polyurethane as soles having a low density ranging from 0.15 to 0.5 g/cm$^3$, even if the polyoxytetramethylene glycol is used.

An object of the present invention is to provide a polyurethane foam for shoe soles having excellent appearance without any peeling of a skin layer or molding shrinkage in the average density of 0.15 to 0.5 g/cm$^3$, which is made of a polyether polyurethane having excellent hydrolysis resistance.

The above and other objects of the present invention will be apparent from the following description.

DISCLOSURE OF INVENTION

The present invention is directed to a polyurethane foam for shoe soles having an average density of 0.15 to 0.5 g/cm$^3$, prepared by reacting polyol components comprising:

(A) a polyether-polyol A having two or more hydroxyl groups;

(B) a polymer-polyol B comprising a polyether-polyol having two or more hydroxyl groups as a base material and fine polymer particles; and (C) a chain extender, with a polyisocyanate compound in the presence of a blowing agent and a catalyst, wherein the amount of the fine polymer particles is 10 to 30 parts by weight, based on 100 parts by weight of the total amount of the polyether-polyol A and the polymer-polyol B.

BEST MODE FOR CARRYING OUT THE INVENTION

Figure 1:
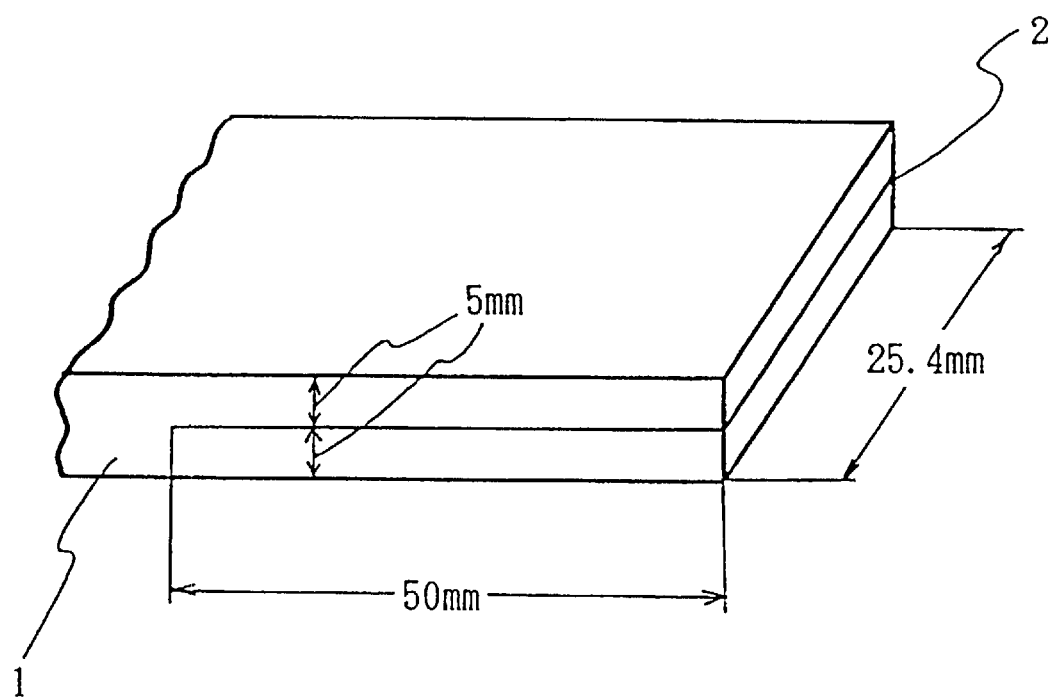
FIG. 1 is a schematic view explaining a method for preparing a test piece of a polyurethane foam which is used for measuring split tear.

The polyurethane foam for shoe soles of the present invention can be obtained by reacting polyol components with a polyisocyanate compound in the presence of a blowing agent and a catalyst.

The polyol components comprise:

(A) a polyether-polyol A having two or more hydroxyl groups (hereinafter simply referred to as "polyether-polyol A");

(B) a polymer-polyol B comprising a polyether-polyol having two or more hydroxyl groups as a base material and fine polymer particles (hereinafter simply referred to as "polymer-polyol B"); and (C) a chain extender.

As the polyether-polyol A, there can be used a polyether-polyol having two or more hydroxyl groups.

The polyether-polyol A includes polyoxypropylene polyols prepared by adding ethylene oxide to the terminal hydroxyl group of a polyoxypropylene polyol, having a molecular weight of at least 1,500 per one hydroxyl group; and polyoxytetramethylene glycol prepared by ring-opening polymerization of tetrahydrofuran, having a molecular weight of at least 1,000, or mixtures thereof.

Since the polyoxypropylene polyol prepared by adding ethylene oxide to the terminal hydroxyl group of the polyoxypropylene polyol, having a molecular weight of at least 1,500 per one hydroxyl group, has a long oxypropylene chain, the polyoxypropylene glycol effectively functions as a soft segment in the polyurethane foam, thereby imparting excellent elongation properties and excellent flexural properties. Therefore, the polyoxypropylene polyol can be desirably used in the present invention. From the viewpoint of effectively functioning the oxypropylene chain as a soft segment, it is desired that the polyoxypropylene polyol has a molecular weight of at least 1,500, preferably at least 1,800, per one hydroxyl group. Also, from the viewpoint of viscosity during handling, it is desired that the upper limit of the molecular weight is at most 20,000, preferably at most 10,000. The desirable range of the molecular weight is from 1,500 to 20,000, preferably 1,800 to 10,000.

The polyoxypropylene polyol can be prepared by subjecting an alkylene oxide to ring-opening addition reaction to a compound having at least two active hydrogen atoms, which is a starting material, and adding ethylene oxide to the molecular terminal of the resulting compound in a block form.

The starting material includes polyhydric alcohols, polyhydric phenols, polyamines, alkanolamines, and the like. The starting material includes ethylene glycol, diethylene glycol, propylene glycol, dipropylene glycol, neopentyl glycol, 1,4-butanediol, 1,6-hexanediol, glycerol, trimethylolpropane, pentaerythritol, diglycerol, dextrose, sucrose, bisphenol A, ethylenediamine, and modified products thereof, and the like. Those starting materials can be used alone or in admixture thereof.

The alkylene oxide to be added to the starting material during the ring-opening addition reaction includes ethylene oxide, propylene oxide, 1,2-butylene oxide, 2,3-butylene oxide, styrene oxide, copolymers thereof, and the like. Among those alkylene oxides, it is desirable to use propylene oxide alone, or a random copolymer or a block copolymer of a propylene oxide and other alkylene oxide, the main component (at least 50% by weight) of which is the propylene oxide.

After the reaction of the starting material with the alkylene oxide, in order to accelerate the formation of a polyurethane foam, it is desired to carry out addition reaction of ethylene oxide to the resulting compound in a block form to give a polyoxypropylene polyol having primary hydroxyl group at its terminal (hereinafter referred to as "terminal primary hydroxyl group"). The ratio of the terminal primary hydroxyl group to total terminal hydroxyl groups (number of terminal primary hydroxyl group/number of total terminal hydroxyl groups), is desirably at least 50%, more desirably at least 80%, from the viewpoints of accelerating the formation of a polyurethane foam, shortening demolding period of time, and adjusting a balance between the resin formation rate and the foam formation rate to avoid the shrinkage of a polyurethane foam.

It is desired that the content of the oxyethylene group in the polyoxypropylene polyols is at most 35% by weight from the viewpoint of water resistance, and that the content is at least 5% by weight from the viewpoint of the ratio of the terminal primary hydroxyl group to the total terminal hydroxyl groups. Incidentally, the polyoxypropylene polyols can be prepared by mixing several polyoxyalkylene polyols as long as the molecular weight per one hydroxyl group, the content of oxyethylene group, and the ratio of the terminal primary hydroxyl group to the total terminal hydroxyl groups of the overall polyether-polyol A are within the above given ranges.

The polyoxytetramethylene glycol prepared by ring-opening polymerization of tetrahydrofuran, having a molecular weight of at least 1,000, possesses properties for improving mechanical characteristics owing to its molecular structure, and can be desirably used in the present invention. It is desired that the molecular weight of the polyoxytetramethylene glycol is at least 1,000, preferably at least 1,400, from the aspect of effectiveness of the oxytetramethylene chain as a soft segment, and that the upper limit of the molecular weight is at most 3,000, preferably 2,300, so that the polyoxytetramethylene glycol can be liquid at the operable temperature.

When the polyoxytetramethylene glycol is used, mechanical characteristics are synergistically improved by a combined use with the polymer-polyol B, so that there can be prepared a polyurethane foam having excellent mechanical characteristics, which can be sufficiently employed for uses such as soles having a low density of 0.15 to 0.5 $g/cm^3$ or so.

The polymer-polyol B comprises a polyether-polyol having two or more hydroxyl groups as a base material. When the polymer-polyol B is used, as compared to a case where a polyether-polyol A is used alone, there can be prepared a polyurethane foam having high hardness, high percentage of open cells, and excellent physical properties such as fracture strength, elongation at break, tear strength, split tear, and low compressive permanent strain.

The polymer-polyol B includes a polyether-polyol having two or more hydroxyl groups and fine polymer particles prepared by polymerizing a polymerizable unsaturated group-containing monomer, and the fine polymer particles are dispersed in the polyether-polyol.

The polymer-polyol B in which the fine polymer particles are dispersed in the polyether-polyol can be prepared, for instance, by a process comprising mixing fine polymer particles prepared by polymerizing a polymerizable unsaturated group-containing monomer with the polyether polyol and dispersing the fine polymer particles in the polyether-polyol (hereinafter referred to as "process A"); a process comprising polymerizing a polymerizable unsaturated group-containing monomer in a polyether-polyol to disperse the fine polymer particles made of the polymerizable unsaturated group-containing monomer in the polyether-polyol (hereinafter referred to as "process B"), and the like. According to the process B, the polymer-polyol B in which the fine polymer particles are uniformly dispersed in the polyether-polyol can be easily prepared. Therefore, the process B can be desirably employed in the present invention.

The particle diameter of the fine polymer particles is not limited to specified ones. It is desired that the particle diameter of the fine polymer particles is at most 30 μm, preferably at most 10 μm, from the viewpoint of avoiding poor dispersibility due to sedimentation, and that the particle diameter is at least 0.1 μm, preferably at least 0.5 μm, from the viewpoint of avoiding difficulty in handling due to increase in viscosity.

The polymerizable unsaturated group-containing monomer includes styrene; acrylonitrile; alkyl methacrylates having an alkyl group of 1 to 4 carbon atoms, such as methyl methacrylate, ethyl methacrylate and butyl methacrylate; glycidyl methacrylate; alkyl acrylates having an alkyl group of 1 to 4 carbon atoms, such as methyl acrylate, ethyl acrylate and butyl acrylate; glycidyl acrylate, and the like. Those monomers can be used alone or in admixture thereof. Among those monomers, at least one monomer selected from the group consisting of styrene, acrylonitrile and methyl methacrylate can be desirably used.

When preparing a white polyurethane foam, particularly in a case of using a polymer-polyol B comprising an acrylonitrile-styrene copolymer, the whiteness of the polyurethane foam is greatly affected by a styrene content. When the styrene content in the fine polymer particles contained in the polymer-polyol B is at least 40% by weight, the white polyurethane foam attains to a usable level. Particularly, it is desirable that the styrene content is at least 50% by weight, because the whiteness of the polymer-polyol B is highly improved. The upper limit of the styrene content in the fine polymer particles contained in the polymer-polyol B is not limited to specified ones. The styrene content may be 100% by weight, i.e. styrene may be used alone.

When the process B is employed, as a method for polymerizing a polymerizable unsaturated group-containing monomer in a polyether-polyol having two or more hydroxyl groups, there can be used a known method, such as a method comprising polymerizing a polymerizable unsaturated group-containing monomer in a polyether-polyol having two or more hydroxyl groups in the presence of a dispersion stabilizer and a radical polymerization initiator.

In order to impart high hardness to the resulting polyurethane foam, it is desired that the content of the fine polymer particles in the polymer-polyol B is at least 15% by weight, preferably at least 20% by weight, more preferably at least 30% by weight. Also, from the viewpoints of improving uniform dispersion stability of the fine polymer particles, operability in the aspect of viscosity, and moldability of the polyurethane foam, it is desired that the content of the fine polymer particles is at most 50% by weight, preferably at most 45% by weight.

The polyether-polyol having two or more hydroxyl groups which is used in the polymer-polyol B can be a polyoxypropylene polyol which is used as the polyether-polyol A.

As the polyether-polyol having two or more hydroxyl groups, from the viewpoint of the dispersion stability of the fine polymer particles, the polyoxypropylene polyols having a relatively high molecular weight are desirable. It is particularly desirable to use polyoxypropylene triols, the starting material of which is only a tri-functional hydroxyl group-containing compound such as glycerol or trimethylolpropane, or a monomer mixture of which main component (at least 50% by weight) is the tri-functional hydroxyl group-containing compound. In cases where two or more polyether-polyols having two or more hydroxyl groups are used in combination, it is desired that the average hydroxyl groups per one molecule of the polyether-polyol is from 2.5 to 4.0. From the viewpoint of the dispersion stability of the fine polymer particles, it is desired that the molecular weight is at least 1,800, preferably at least 3,000. Also, from the viewpoint of easy handling, it is desired that the molecular weight is at most 20,000, preferably at most 10,000. Further, it is desired that the content of the oxyethylene group and the ratio of the terminal primary hydroxyl group to the total terminal hydroxyl groups are the same as those defined for the polyoxypropylene polyols used as the polyether-polyol A.

The polyoxypropylene polyols which can be used in polymer-polyol B may be prepared by mixing several polyoxyalkylene polyols as long as the average number of functional groups, the average molecular weight, the content of the oxyethylene group, and the ratio of the terminal primary hydroxyl group to the total terminal hydroxyl groups of the mixed polyoxyalkylene polyol are within the ranges described above.

The proportion of the polyether-polyol A to the polymer-polyol B varies depending upon the content of the fine polymer particles in the polymer-polyol B, constituents of the fine polymer particles, and the like. Usually, when the weight ratio of the polyether-polyol A to the polymer-polyol B is large, there is a tendency that the hardness of the resulting polyurethane foam becomes relatively low. Accordingly, there is a necessity to increase the amount of the chain extender to give a polyurethane foam having a desired hardness, thereby resulting in a decrease in the elongation at break. Therefore, it is desired that the weight ratio of the polyether-polyol A to the polymer-polyol B is at most 80/20, preferably at most 70/30. On the other hand, it is desired that the weight ratio of the polyether-polyol A to the polymer-polyol B is at least 20/80, preferably at least 30/70, from the viewpoints of decreasing the viscosity of the polyol components and improving the moldability of the polyurethane foam.

Also, the amount of the fine polymer particles is at least 10 parts by weight in order to avoid the shrinkage of a polyurethane foam, and at most 30 parts by weight, preferably at most 25 parts by weight in order to improve the moldability of a polyurethane foam, based on 100 parts by weight of the total amount of the polyether-polyol A and the polymer-polyol B.

The chain extender includes low molecular compounds having two or more active hydrogen atom-containing groups reactive with isocyanate group, such as hydroxyl group, primary amino group, or secondary amino group.

The chain extender includes polyhydric alcohols such as ethylene glycol, diethylene glycol, propylene glycol, dipropylene glycol, 1,4-butanediol, 1,6-hexanediol, neopentyl glycol, glycerol, trimethylolpropane, triethanolamine and alkylene oxide adducts of bisphenol A; polyamines such as diethyltoluenediamine, chlorodiaminobenzene, ethylenediamine and 1,6-hexanediamine; and the like. Those chain extenders can be used alone, or in admixture thereof.

The polyisocyanate compound includes aromatic polyisocyanates, alicyclic polyisocyanates and aliphatic polyisocyanates, each having two or more isocyanate groups in its molecule; mixtures thereof; modified polyisocyanates prepared by modifying the polyisocyanate compound, and the like. Examples of the polyisocyanate compound include aromatic polyisocyanates such as tolylene diisocyanate, methylenediphenyl diisocyanate, naphthylene diisocyanate, xylylene diisocyanate and polymethylenepolyphenylene diisocyanate; alicyclic polyisocyanates such as hydrogenated methylenediphenyl diisocyanate, hydrogenated tolylene diisocyanate and isophorone diisocyanate; aliphatic polyisocyanates such as hexamethylene diisocyanate and lysine diisocyanate; mixtures thereof; modified products thereof, and the like. The modified product includes prepolymer modified products which are reaction products with a polyol, nurate modified products, urea modified products, carbodiimide modified products, arophanate modified products, burette modified products, and the like. Among them, the aromatic polyisocyanates, excluding polymers such as polymethylenepolyphenylene diisocyanate, and modified products thereof are desirable. In particular, there can be extremely desirably used a polyisocyanate compound including a soft segment comprising a polyoxyalkylene glycol, which is prepolymerized with methylenediphenyl diisocyanate and/or a modified product thereof because this polyisocyanate compound is effective in improving the mechanical characteristics of the polyurethane foam having a low density.

The polyoxyalkylene glycol can be prepared in the same manner as the process for preparing the aforementioned polyoxypropylene polyol. Among the polyoxyalkylene glycols, a polyoxypropylene glycol having a molecular weight of at least 1,000 per one hydroxyl group can be desirably used. Since the polyoxypropylene glycol has a long oxyalkylene chain, it effectively functions as a soft segment in the polyurethane foam, thereby imparting excellent elongation properties and flexural properties to a resulting polyurethane foam. Since the polyoxyalkylene glycol is previously reacted with a polyisocyanate compound, the formation of primary hydroxyl group at the terminal is not necessarily required, and ethylene oxide may be added to the terminal hydroxyl group, or it may not be added at all. In the prepolymer, there may be included a reaction product of methylenediphenyl diisocyanate or a modified product thereof with a chain extender.

The blowing agent includes water, hydrocarbons, chlorofluorocarbons, hydrogenated fluorocarbons, and the like. Those blowing agents may be used alone or in admixture thereof. From the viewpoint of environmental protection, it is desirable to use water alone.

From the viewpoint of improvement in the reaction rate, a catalyst is used. As to the catalyst, a tertiary amine can be mainly used.

The catalyst includes 1,4-diazabicyclo-(2,2,2)-octane [hereinafter referred to as "TEDA"]; N,N,N',N'-tetramethylhexamethylenediamine typically exemplified by trade name: "KAOLIZER No. 1" manufactured by Kao Corporation; N,N,N',N'-tetramethylpropylenediamine typically exemplified by trade name: "KAOLIZER No. 2" manufactured by Kao Corporation; N,N,N',N',N"-pentamethyldiethylenetriamine typically exemplified by trade name: "KAOLIZER No. 3" manufactured by Kao Corporation; trimethylaminoethylpiperazine typically exemplified by trade name: "KAOLIZER No. 8" manufactured by Kao Corporation; N,N-dimethylcyclohexylamine typically exemplified by trade name: "KAOLIZER No. 10" manufactured by Kao Corporation; N,N-dimethylbenzylamine typically exemplified by trade name: "KAOLIZER No. 20" manufactured by Kao Corporation; N-methylmorpholine typically exemplified by trade name: "KAOLIZER No. 21" manufactured by Kao Corporation; N-ethylmorpholine typically exemplified by trade name: "KAOLIZER No. 22" manufactured by Kao Corporation; triethylamine; tributylamine; bis(dimethylaminoalkyl) piperazines; N,N,N',N'-tetramethylethylenediamine; N,N-diethylbenzylamine; bis(N,N-diethylaminoalkyl)adipates;

N,N,N',N'-tetramethyl-1,3-butanediamine; N,N-dimethyl-β-phenylethylamine; 1,2-dimethylimidazole; 2-methylimidazole, and the like. Those catalysts may be used alone or in admixture thereof. Examples of the catalyst other than the tertiary amines include organometal compounds such as dibutyltin dilaurate, stannous oleate, cobalt naphthenate, and lead naphthenate.

As other additives, silicone cell regulators, pigments, antioxidants, and yellow coloration preventives can be used in proper amounts.

When the polyol components are reacted with the polyisocyanate compound, it is desired that the proportion thereof is such that the isocyanate index is adjusted to 85 to 115, preferably 85 to 105, more preferably 95 to 105.

The process for preparing a polyurethane foam of the present invention comprises the steps of mixing and stirring the polyol components and the polyisocyanate component, the polyol components being previously mixed with a catalyst, a blowing agent and other additives in a molding machine; and pouring the resulting mixture into a mold to form a polyurethane foam. More concretely, there can be included a process comprising the step of reacting the polyol components with the polyisocyanate compound using a blowing machine such as an automatically mixing and injecting foaming machine or an automatically blending and injecting foaming machine to form a polyurethane foam, the temperature of the polyol components being previously usually adjusted to 40° C. or so using a tank.

The polyurethane foam of the present invention has an average density of 0.15 to 0.5 g/cm$^3$, and no peeling of a skin layer and no molding shrinkage, and also having excellent appearance.

EXAMPLES 1 TO 8 AND COMPARATIVE EXAMPLES 1 TO 3

The compounds shown in Table 1 were used as the polyether-polyol A and the polymer-polyol B for the polyol components, and mixed together in a ratio shown in Table 1.

As a chain extender, ethylene glycol was used, and the amount of ethylene glycol was adjusted to that shown in Table 1 to give a polyurethane foam having a desired hardness.

The polyol components were prepared in a blowing machine by adding and stirring 0.5 parts by weight of TEDA as a catalyst, and given amounts of the chain extender and water, per 100 parts by weight of the total amount of the polyether-polyol A and the polymer-polyol B.

The amount (parts by weight) of the fine polymer particles is based on 100 parts by weight of the total amount of the polyether-polyol A and the polymer-polyol B.

As a polyisocyanate compound, a methylenediphenyl diisocyanate-modified prepolymer was used. This methylenediphenyl diisocyanate-modified prepolymer was prepared by adding dropwise a mixture of 35 parts by weight of Polyol III described below and 5 parts by weight of dipropylene glycol to 60 parts by weight of methylenediphenyl diisocyanate, and the resulting mixture was heated with stirring at a temperature of 50° to 60° C. for two hours.

The mixing ratio of the polyol components and the polyisocyanate compound is determined from the free foam state in the foam reaction, and the isocyanate index was 90 to 100 or so.

The polyol components shown in Table 1 were charged in one of two tanks for a pouring-type low-pressure foaming machine, and the temperature inside this tank was adjusted to a temperature of 35° to 45° C., and the polyisocyanate compound was charged in another tank, and the temperature inside this tank was similarly adjusted to a temperature of 35° to 45° C.

The polyol components and the polyisocyante compound were mixed with stirring using a foam machine, and the resulting mixture was poured into a mold to foam to give a polyurethane foam of 100 mm×300 mm×10 mm.

The physical properties of the resulting polyurethane foam were evaluated by the following methods. The results are shown in Table 1.

Abbreviations for the polyol components used in each of Examples and Comparatives mean the following:

Polyether-Polyol A

1) Polyether-Polyol I: Polyoxytetramethylene glycol having a molecular weight of 2,000 (trade name: "PTG-2000SNW" manufactured by Hodogaya Chemical Kogyo K.K.)
2) Polyether-Polyol II: Polyoxypropylene triol having a molecular weight of 6,000, prepared by sequentially adding propylene oxide and ethylene oxide to glycerol (content of oxyethylene group: 20% by weight; ratio of terminal primary hydroxyl group to total terminal hydroxyl groups: 88%)
3) Polyether-Polyol III: Polyoxypropylene glycol having a polyoxyethylene terminal and a molecular weight of 4,000, prepared by sequentially adding propylene oxide and ethylene oxide to dipropylene glycol (content of oxyethylene group: 20% by weight; ratio of terminal primary hydroxyl group to total terminal hydroxyl groups: 91%)

Polymer-Polyol B

1) Polymer-Polyol I: Polymer-polyol [color: white] composed of fine particles prepared by polymerizing acrylonitrile monomer and styrene monomer in a ratio of acrylonitrile monomer/styrene monomer of 30% by weight/70% by weight in polyoxypropylene triol (content of oxyethylene group: 20% by weight; ratio of terminal primary hydroxyl group to total terminal hydroxyl groups: 71%) having a polyoxyethylene terminal and a molecular weight of 3,000, which was prepared by sequentially adding propylene oxide and ethylene oxide to glycerol. The content of the resulting fine particles is 40% by weight, i.e. the content of the polyol components is 60% by weight in the polymer-polyol.
2) Polymer-Polyol II: Polymer-polyol [color: white] composed of fine particles prepared by polymerizing acrylonitrile monomer and styrene monomer in a ratio of acrylonitrile monomer/styrene monomer of 50% by weight/50% by weight in polyoxypropylene triol having a polyoxyethylene terminal and a molecular weight of 3,000 (content of oxyethylene group: 20% by weight; ratio of terminal primary hydroxyl group to total terminal hydroxyl groups: 71%), which was prepared by sequentially adding propylene oxide and ethylene oxide to glycerol. The content of the resulting fine particles is 20% by weight, i.e. the content of the polyol components is 80% by weight in the polymer-polyol.
3) Polymer-Polyol III: Polymer-polyol [color: yellowish white] composed of fine particles prepared by polymerizing acrylonitrile monomer and styrene monomer in a ratio of acrylonitrile monomer/styrene monomer of 75% by weight/25% by weight in polyoxypropylene triol having a polyoxyethylene terminal and a molecular weight of 3,000 (content of oxyethylene group: 20% by weight;

ratio of terminal primary hydroxyl group to total terminal hydroxyl groups: 71%), which was prepared by sequentially adding propylene oxide and ethylene oxide to glycerol. The content of the resulting fine particles is 40% by weight, i.e. the content of the polyol components is 60% by weight in the polymer-polyol.

Physical Properties of Foam

[Average Density]

The weight of the polyurethane foam of 100 mm×300 mm×10 mm was measured, and the weight was divided by its volume, i.e. 300 cm$^3$.

[Hardness]

The hardness of the polyurethane foam was measured by an Asker C hardness meter.

[Peeling of Skin Layer]

The resulting polyurethane foam was observed by naked eyes, and evaluated in accordance with the following standards.

The term "peeling of skin layer" means that the surface layer portion (skin portion of the polyurethane foam) is peeled, or a gap is formed between the skin portion and the body of the polyurethane foam.

Evaluation Standards:

○: no peeling of skin layer being observed; and x: peeling of skin layer being observed.

[Foam Shrinkage]

The resulting polyurethane foam was observed by naked eyes, and evaluated by the following standards:

The term "foam shrinkage" means that there is generated a gap between a mold of polypropylene having an inner diameter of 6.6 cm and a depth of 10.5 cm and a polyurethane foam when a polyurethane foam is prepared by pouring its starting materials for a polyurethane foam in the mold to expand and allowing them to stand at room temperature for one day.

Evaluation Standards:

○: no foam shrinkage being observed; and x: foam shrinkage being observed.

[Strength at Break]

The strength at break was measured by a method according to JIS K-6301, where a resin was replaced with the polyurethane foam.

[Elongation at Break]

The elongation at break was measured by a method according to JIS K-6301, where a resin was replaced with the polyurethane foam.

[Tear Strength]

The tear strength was measured by a method according to JIS K-6301, where a resin was replaced with the polyurethane foam.

[Split Tear]

The split tear was measured by a method according to ASTM D-3574, where a resin was replaced with the polyurethane foam. Specifically, as shown in FIG. 1, a polyurethane foam of 100 mm×300 mm×10 mm was cut to give a test piece 1 of 25.4 mm×150 mm×10 mm, and the test piece 1 was cut at the central portion of its thickness (10 mm) in a horizontal direction from its end in the length 2 of 50 mm.

Next, the split tear was measured by using an autograph "DCS-50M" (trade name) manufactured by Shimadzu Corporation at a speed of 50 mm/min, and converted to KN/m units.

[Color of Foam]

The resulting polyurethane foam was observed with naked eyes.

TABLE 1

| Example No. | Composition of Starting Materials (Parts by Weight) | | | | | | | | | Content of Fine Polymer Particles (Parts by Weight) |
|---|---|---|---|---|---|---|---|---|---|---|
| | Polyether-Polyol | | | Polymer-Polyol | | | Ethylene Glycol | Catalyst | Blowing Agent (Water) | |
| | I | II | III | I | II | III | | | | |
| 1 | 50 | — | — | 50 | — | — | 5.0 | 0.5 | 1.3 | 20 |
| 2 | — | 50 | — | 50 | — | — | 5.0 | 0.5 | 1.3 | 20 |
| 3 | — | 30 | — | 70 | — | — | 3.5 | 0.5 | 1.3 | 28 |
| 4 | 70 | — | — | 30 | — | — | 6.5 | 0.5 | 1.3 | 12 |
| 5 | 50 | — | — | — | 50 | — | 5.0 | 0.5 | 1.3 | 10 |
| 6 | 50 | — | — | 50 | — | — | 7.0 | 0.5 | 1.5 | 20 |
| 7 | 50 | — | — | 50 | — | — | 3.0 | 0.5 | 1.0 | 20 |
| 8 | 50 | — | — | — | — | 50 | 5.0 | 0.5 | 1.3 | 20 |
| Comp. Ex. | | | | | | | | | | |
| 1 | 100 | — | — | — | — | — | 8.0 | 0.5 | 1.3 | 0 |
| 2 | — | 50 | 50 | — | — | — | 8.0 | 0.5 | 1.3 | 0 |
| 3 | 80 | — | — | 20 | — | — | 7.0 | 0.5 | 1.3 | 8 |

| | Properties of Polyurethane Foam | | | | | | | | |
|---|---|---|---|---|---|---|---|---|---|
| Example No. | Average Density (g/cm$^3$) | Hardness (Asker C) | Peel of Skin Layer | Foam Shrinkage | Strength at Break (MPa) | Elongation at Break (%) | Tear Strength (KN/m) | Split Tear (KN/m) | Color of Foam |
| 1 | 0.30 | 60 | ○ | ○ | 2.4 | 370 | 12.5 | 2.3 | White |
| 2 | 0.30 | 59 | ○ | ○ | 2.3 | 380 | 11.4 | 2.3 | White |
| 3 | 0.30 | 61 | ○ | ○ | 2.3 | 350 | 11.6 | 2.3 | White |
| 4 | 0.30 | 61 | ○ | ○ | 2.5 | 330 | 13.2 | 2.5 | White |
| 5 | 0.30 | 58 | ○ | ○ | 2.4 | 370 | 12.3 | 2.0 | White |
| 6 | 0.25 | 59 | ○ | ○ | 2.1 | 320 | 11.4 | 2.0 | White |
| 7 | 0.40 | 60 | ○ | ○ | 3.0 | 410 | 14.2 | 2.7 | White |
| 8 | 0.30 | 62 | ○ | ○ | 2.4 | 370 | 12.1 | 2.3 | Slightly |

TABLE 1-continued

| Comp. Ex. | | | | | | | | | |
|---|---|---|---|---|---|---|---|---|---|
| 1 | 0.30 | 62 | x | x | 2.4 | 320 | 12.0 | 2.2 | White |
| 2 | 0.30 | 58 | x | x | 1.8 | 340 | 10.5 | 1.9 | White |
| 3 | 0.30 | 60 | o | x | 2.3 | 380 | 11.9 | 2.3 | White |

It is clear from the results shown in Table 1 that the polyurethane foams obtained in Examples 1 to 7 have white color, without having peeling of skin layers or foam shrinkage, and also have excellent strength at break, elongation at break, and split tear, all of the properties satisfying the requirements for shoe soles.

On the other hand, it can be seen that peeling of skin layers and foam shrinkage are generated in the polyurethane foams obtained in Comparative Examples 1 and 2, thereby making it undesirable for practical purposes, since the components and amounts of the polyol components are different from those of Examples 1 to 7.

In addition, since the polyurethane foam obtained in Example 8 contains an excessive amount of acrylonitrile in the fine polymer particles, the resulting foam exhibits a slightly yellowish color, thereby causing some defects when used for white mid-soles, but can be used without any practical problems for deep colored mid-soles.

INDUSTRIAL APPLICABILITY

According to the present invention, there can be provided a polyurethane foam for shoe soles having acceptable appearance without having peeling of skin layers or molding shrinkage in the average density of 0.15 to 0.5 g/cm$^3$.

What is claimed is:

1. A polyurethane foam for shoe soles having an average density of 0.15 to 0.5 g/cm$^3$, prepared by reacting polyol components comprising:

(A) a polyether-polyol A having two or more hydroxyl groups, selected from the group consisting of polyoxypropylene polyols prepared by adding ethylene oxide to the terminal hydroxyl group of a polyoxypropylene polyol and a polyoxytetramethylene glycol prepared by ring-opening polymerization of tetrahydrofuran;

(B) a polymer-polyol B comprising a polyether-polyol having two or more hydroxyl groups as a base material and fine polymer particles; and (C) a chain extender, with a polyisocyanate compound in the presence of a blowing agent and a catalyst, wherein the amount of the fine polymer particles is 10 to 30 parts by weight, based on 100 parts by weight of the total amount of the polyether-polyol A and the polymer-polyol B.

2. The polyurethane foam for shoe soles according to claim 1, wherein the polymer-polyol B comprises a polyether-polyol having two or more hydroxyl groups and fine polymer particles prepared by polymerizing a polymerizable unsaturated group-containing monomer, said fine polymer particles being dispersed in the polyether-polyol.

3. The polyurethane foam for shoe soles according to claim 1 or 2, wherein the polymer-polyol B comprises a polyether-polyol having two or more hydroxyl groups and fine polymer particles prepared by polymerizing a polymerizable unsaturated group-containing monomer in the polyether-polyol to disperse the fine polymer particles in the polyether-polyol.

4. The polyurethane foam for shoe soles according to claim 3, wherein the polymerizable unsaturated group-containing monomer is at least one monomer selected from the group consisting of styrene, acrylonitrile and methyl methacrylate.

5. The polyurethane foam for shoe soles according to claim 1, wherein the polyisocyanate compound includes a soft segment comprising a polyoxyalkylene glycol, and being prepolymerized forms a prepolymer with methylenediphenyl diisocyanate or a modified product thereof.

* * * * *